US012793894B2

(12) United States Patent
Song et al.

(10) Patent No.: US 12,793,894 B2
(45) Date of Patent: Nov. 10, 2026

(54) MULTILAYER ELECTRONIC COMPONENT

(71) Applicant: SAMSUNG ELECTRO-MECHANICS CO., LTD., Suwon-si (KR)

(72) Inventors: Jun Il Song, Suwon-si (KR); Jeong Hwan Son, Suwon-si (KR); Sung Hyung Kang, Suwon-si (KR); Hong Seok Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 145 days.

(21) Appl. No.: 18/971,664

(22) Filed: Dec. 6, 2024

(65) Prior Publication Data

US 2025/0218661 A1 Jul. 3, 2025

(30) Foreign Application Priority Data

Dec. 28, 2023 (KR) ........................ 10-2023-0194476

(51) Int. Cl.

| | |
|---|---|
| ***H01G 4/008*** | (2006.01) |
| ***H01G 4/012*** | (2006.01) |
| ***H01G 4/12*** | (2006.01) |
| ***H01G 4/224*** | (2006.01) |
| ***H01G 4/30*** | (2006.01) |

(52) U.S. Cl.
CPC ............. *H01G 4/008* (2013.01); *H01G 4/012* (2013.01); *H01G 4/12* (2013.01); *H01G 4/224* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2014/0054514 | A1* | 2/2014 | Kim | H01C 10/00 336/200 |
| 2020/0126731 | A1* | 4/2020 | Yao | H01G 4/008 |
| 2023/0082454 | A1* | 3/2023 | Oh | H01G 4/30 361/301.4 |
| 2025/0218661 | A1* | 7/2025 | Song | H01G 4/12 |
| 2025/0218682 | A1* | 7/2025 | Yoon | H01G 4/012 |

FOREIGN PATENT DOCUMENTS

| | | | | |
|---|---|---|---|---|
| JP | 2013-157459 | A | | 8/2013 |
| JP | 6292014 | B2 | * | 3/2018 |
| KR | 10-2014-0025693 | A | | 3/2014 |

* cited by examiner

*Primary Examiner* — Dion R. Ferguson
(74) *Attorney, Agent, or Firm* — Morgan, Lewis & Bockius LLP

(57) ABSTRACT

The present disclosure is a multiplayer electronic component including an internal electrode comprising Ni and an Ni-containing oxide, and the distribution of the Ni-containing oxide is adjusted, thereby improving mechanical strength and withstand voltage characteristics of a multilayer electronic component.

12 Claims, 8 Drawing Sheets

MULTILAYER ELECTRONIC COMPONENT

CROSS-REFERENCE TO RELATED APPLICATION(S)

This application claims benefit of priority to Korean Patent Application No. 10-2023-0194476 filed on Dec. 28, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser, mounted on the printed circuit boards of various types of electronic product, such as image display devices including a liquid crystal display (LCD) and a plasma display panel (PDP), smartphones and mobile phones, and serves to computers, charge or electricity therein or discharge electricity therefrom.

Currently, as electronic devices are miniaturized, miniaturization and high integration of multilayer electronic components are also greatly demanded. Specifically, in the case of a multilayer ceramic capacitors (MLCC) as general-purpose electronic components, there have been various attempts to make the MLCC thinner and more capacitive.

As the multilayer electronic component are made thinner or more capacitive, reliability of the multilayer electronic components has frequently deteriorated. Accordingly, structural improvements in dielectric layers or internal electrodes are required so that reliability is not deteriorated even in a miniaturized, high-capacitance multilayer electronic component.

SUMMARY

An aspect of the present disclosure is to suppress the deterioration of reliability and mechanical strength of a multilayer electronic component due to thinning of dielectric layers or internal electrodes.

However, the aspects of the present disclosure are not limited to the above-described contents, and may be more easily understood in the process of describing specific embodiments of the present disclosure.

A multilayer electronic component according to an example embodiment of the present disclosure may include: a body including a dielectric layer and a first internal electrode and a second internal electrode alternately arranged in a first direction with the dielectric layer interposed therebetween; and external electrodes respectively disposed on surfaces opposing each other in a second direction, perpendicular to the first direction of the body, and the internal electrodes may include an Ni-containing oxide and Ni, a region in which the first internal electrode and the second internal electrode may overlap each other in the first direction is defined as a capacitance formation portion, and in a first and third directional cross-section of the body, the capacitance formation portion may include a center portion disposed in a center of the capacitance formation portion in the first direction and the third direction, and side portions disposed on upper and lower portions of the capacitance formation portion in the first direction and on both side surfaces of the capacitance formation portion in the third direction, and when a ratio of an area of the Ni-containing oxide included in the center portion to an area of the center portion is defined as SC, and a ratio of an area of the Ni-containing oxide included in the side portion to an area of the side portion is defined as SMT, $0.9<SMT/SC<1.1$ may be satisfied.

One of the various effects of the present disclosure is to uniformly form an Ni-containing oxide on an internal electrode by controlling a degree of oxidation of the internal electrode, thereby improving the reliability and mechanical strength of a multilayer electronic component.

Advantages and effects of the present disclosure are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
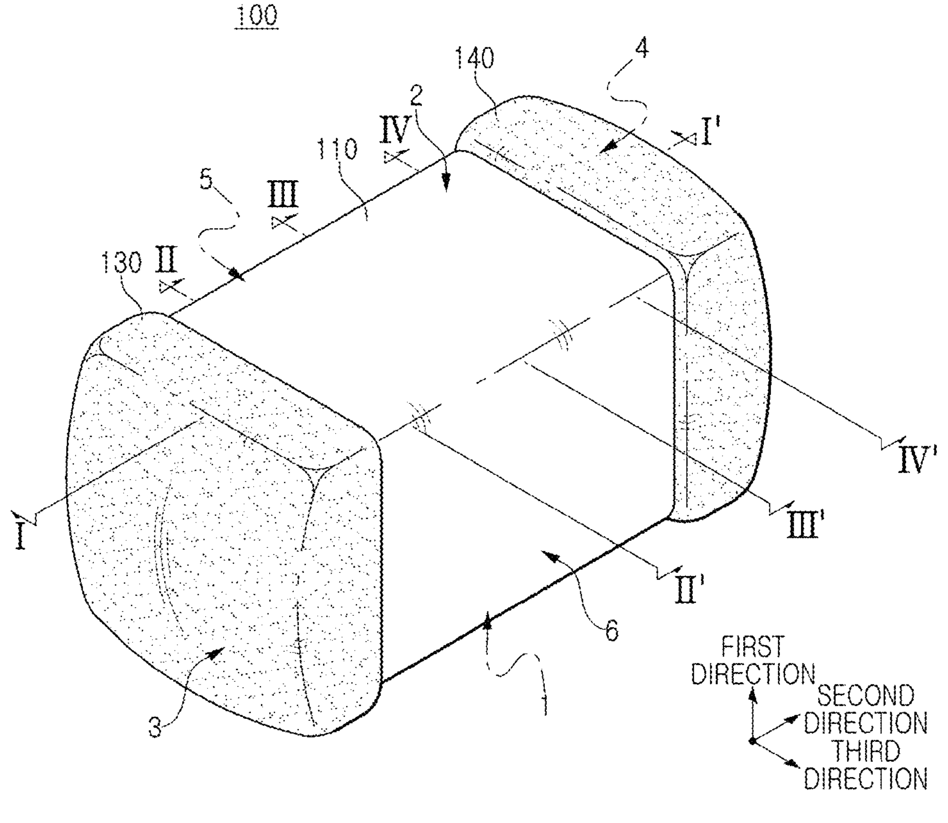
FIG. 1 is a schematic perspective view of a multilayer electronic component according to an example embodiment of the present disclosure.
Figure 2:
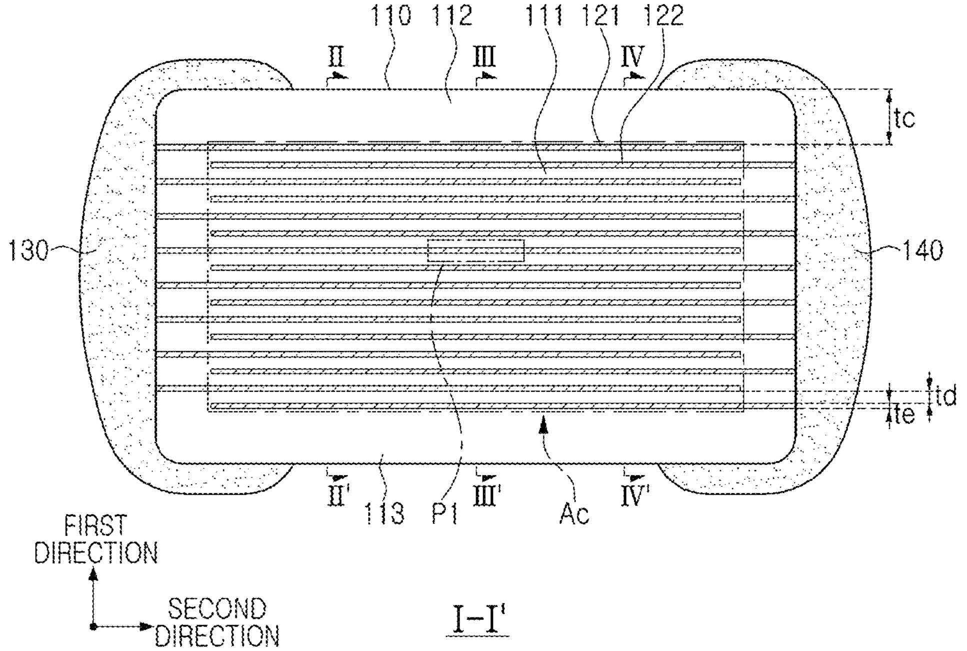
FIG. 2 is a cross-sectional view taken along line I-I of FIG. 1.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. The example embodiments disclosed herein are provided for those skilled in the art to better explain the present disclosure. Therefore, in the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a direction in which first and second internal electrodes are alternately arranged a dielectric with layer therebetween or a thickness (T) direction, the second direction, among second and third directions, perpendicular to the first direction, may be defined as a length (L) direction, and the third direction may be defined as a width (W) direction.

A multilayer electronic component 100 according to some example embodiments of the present disclosure may include: a body 110 including a dielectric layer 111 and a first internal electrode 121 and a second internal electrode 122 alternately arranged in the first direction with the dielectric layer interposed therebetween; and external electrodes 130 and 140 respectively disposed on surfaces opposing each other in a second direction, perpendicular to the first direction of the body, and the internal electrode includes an Ni-containing oxide and Ni, a region in which the first internal electrode and the second internal electrode overlap each other in the first direction is defined as a capacitance formation portion Ac, and in first and third directional cross-section of the body, the capacitance formation portion includes a center portion C1 disposed in a center of the capacitance formation portion in the first direction and the third direction, and side portions T1-1, T1-2, M1-1 and M1-2 disposed on upper and lower portions of the capacitance formation portion in the first direction and on both side surfaces of the capacitance formation portion in the third direction, and when a ratio of an area of the Ni-containing oxide included in the center portion to an area of the center portion is defined as SC, and a ratio of an area of the Ni-containing oxide included in the side portion to an area of the side portion is defined as SMT, $0.9<SMT/SC<1.1$ may be satisfied.

The body 110 may include a dielectric layer 111, and internal electrode layers 121 and 122 alternately arranged in the first direction with the dielectric layer 111 interposed therebetween.

A specific shape of the body 110 is not particularly limited, but as illustrated, the body 110 may have a hexahedral shape or a shape similar thereto. Due to contraction of ceramic powder particles included in the body 110 during a sintering process, the body 110 may not have a hexahedral shape with entirely straight lines but may substantially have a hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and fifth and sixth surfaces 5 and 6 connected to the second surfaces 1 and 2 and connected to the third and fourth surfaces 3 and 4 and opposing each other in the third direction.

In a state in which a plurality of dielectric layers 111 are sintered, boundaries between adjacent dielectric layers 111 may be integrated so as to be difficult to identify without using a scanning electron microscope (SEM).

According to some example embodiments of the present disclosure, a material for forming the dielectric layer 111 is not particularly limited as long as a sufficient electrostatic capacitance may be obtained therewith. For example, a barium titanate-based material, a lead composite perovskite-based material, a strontium titanate-based material, or the like, may be used. The barium titanate-based material may include $BaTiO_3$-based ceramic powder particles, and examples of the ceramic powder particles may include $BaTiO_3$, and at least one selected from the group consisting of $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ and $Ba(Ti_{1-y}Zr_y)O_3$ $(0<y<1)$ which is formed by partially employing calcium (Ca) and zirconium (Zr) in $BaTiO_3$.

Additionally, for the material forming the dielectric layer 111, various ceramic additives, organic solvents, binders, dispersants, and the like, may be added to powder particles such as barium titanate ($BaTiO_3$) or the like according to the purpose of the present disclosure.

Meanwhile, an average thickness td of the dielectric layer 111 does not need to be particularly limited. For example, the average thickness td of the dielectric layer 111 may be 0.2 μm or more and 2 μm or less.

When the dielectric layer 111 is formed as a thin film, such as when the average thickness td of the dielectric layer 111 is 0.35 μm or less, the reliability of the multilayer electronic component 100 may be reduced.

However, the multilayer electronic component 100 according to an example embodiment of the present disclosure may include an internal electrode including Ni and a Ni-containing oxide, and, in the first and third directional cross-section of the body 110, the capacitance formation portion may include a center portion C1 disposed in a center of the capacitance formation portion in the first direction and the third direction, and side portions T1-1, T1-2, M1-1 and M1-2 disposed on upper and lower portions of the capacitance formation portion in the first direction and both side surfaces of the capacitance formation portion in the third direction, and when a ratio of an area of the Ni-containing oxide included in the center portion to an area of the center portion is defined as SC, and a ratio of an area of the Ni-containing oxide included in the side portion to an area of the side portion is defined as SMT, the reliability of the multilayer electronic component may be improved by satisfying $0.9<SMT/SC<1.1$. Accordingly, even when the average thickness td of the dielectric layer 111 is 0.35 μm or less, the reliability of the multilayer electronic component 100 may be secured. That is, when the average thickness td of the dielectric layer 111 is 0.35 μm or less, a reliability improvement effect according to the present disclosure may be more remarkable.

The average thickness td of the dielectric layer 111 may refer to an average thickness td of the dielectric layer 111 disposed between the first and second internal electrodes 121 and 122.

The average thickness td of the dielectric layer 111 may be measured by scanning an image of a length and thickness direction (L-T) cross-section of the body 110 with (SEM) a scanning electron microscope of 10,000× magnification. More specifically, the average thickness td of the dielectric layer 111 may be obtained by measuring the thicknesses thereof at multiple points of one dielectric layer, for example, 30 points equally spaced apart from each other in the length direction, from the scanned image, and measuring an average value thereof. The 30 points equally spaced apart from each other may be designated in the capacitance formation portion Ac. Additionally, when the average value is measured by extending an average value measurement up to 10 dielectric layers 111, the average thickness of the dielectric layer 111 may be further generalized.

The body 110 may include a capacitance formation portion Ac, a region in which the first and second internal electrodes 121 and 122 overlap each other in the first direction, and cover portions 112 and 113 formed in an upper portion and a lower portion of the capacitance formation portion Ac in the first direction.

Additionally, the capacitance formation portion Ac is a portion contributing to the capacitance formation of the capacitor, and may be formed by repeatedly stacking a plurality of first and second internal electrodes 121 and 122 with the dielectric layer 111 therebetween.

The cover portion 112 and 113 may include an upper cover portion 112 disposed on one surface of the capacitance formation portion Ac in the first direction, and a lower cover portion 113 disposed on the other surface of the capacitance formation portion Ac in the first direction.

The cover portion 112 and 113 may be formed by stacking a single dielectric layer or two or more dielectric layers in the thickness direction on upper and lower surfaces of the capacitance formation portion Ac, respectively, and may basically serve to prevent damage to the internal electrode due to physical or chemical stress.

The cover portion 112 and 113 does not include an internal electrode and may include the same material as the dielectric layer 111.

That is, the cover portion 112 and 113 may include a ceramic material, and may include, for example, a barium titanate ($BaTiO_3$)-based ceramic material.

Meanwhile, an average thickness of the cover portion 112 and 113 does not need to be particularly limited. However, in order to more easily achieve miniaturization and high capacitance of the multilayer electronic component, the average thickness (tc) of the cover portion 112 and 113 may be 15 μm or less. Additionally, the multilayer electronic component 100 according to an example embodiment of the present disclosure may include an internal electrode including Ni and a Ni-containing material, and in first and third directional cross-section of the body 110, the capacitance formation portion may include a center portion C1 disposed in a center of the capacitance formation portion in the first direction and the third direction, and side portions T1-1, T1-2, M1-1 and M1-2 disposed on an upper portion and a lower portion of the capacitance formation portion the first direction and on both side surfaces of the capacitance formation portion in the third direction, and when a ratio of an area of the Ni-containing oxide included in the center portion to an area of the center portion is defined as SC, and a ratio of an area of the Ni-containing oxide included in the side portion to an area of the side portion is defined as SMT, the reliability of the multilayer electronic component may be improved by satisfying $0.9<SMT/SC<1.1$. Accordingly, even when an average thickness tc of the cover portion is 15 μm or less, the reliability of the multilayer electronic component 100 may be secured.

The average thickness of the cover portion 112 and 113 may refer to a first directional size, and may be an average value of first directional sizes of the cover portion 112 and 113 measured at five points equally spaced apart from each other in the upper portion or the lower portion of the capacitance formation portion Ac.

Margin portions 114 and 115 may be disposed on the side surfaces of the capacitance formation portion Ac.

The margin portions 114 and 115 may include a margin portion 114 disposed on the fifth surface 5 of the body 110 and a margin portion 115 disposed on the sixth surface 6. That is, the margin portions 114 and 115 may be disposed on both end surfaces of the body 110 in the third direction (width direction).

Figure 5:
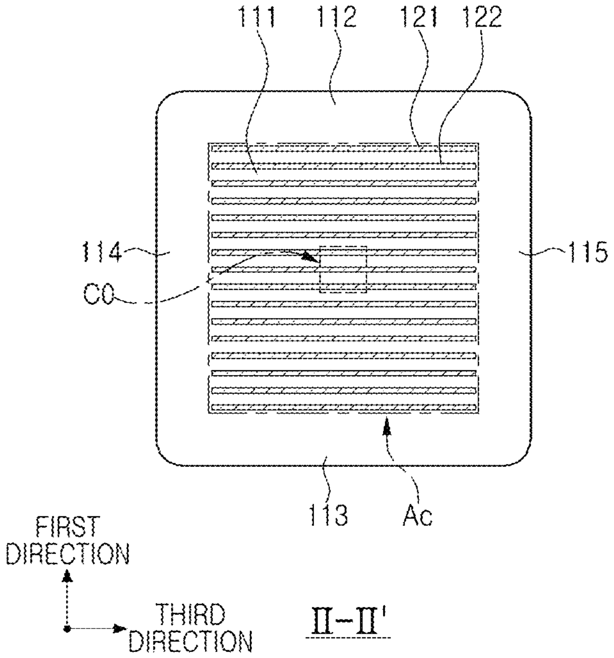
FIG. 5 is a cross-sectional view taken along line II-II of FIG. 1.

As illustrated in FIG. 5, the margin portions 114 and 115 may refer to a region between both ends of the first and second internal electrodes 121 and 122 and a boundary surface of the body 110 in a cross-section obtained by cutting the body 110 in a width-thickness (W-T) direction, The margin portions 114 and 115 may basically serve to prevent damage to the internal electrode due to physical or chemical stress.

The margin portions 114 and 115 may be formed by forming the internal electrode by applying a conductive paste except for a region in which the margin portion is to be formed on the ceramic green sheet.

Additionally, in order to suppress a step portion by the internal electrodes 121 and 122, the internal electrodes may be stacked and then cut to be exposed to the fifth and sixth surfaces 5 and 6 of the body, and then, a single dielectric layer or two or more dielectric layers may be stacked in the third direction (width direction) on both side surfaces of the capacitance formation portion Ac, thereby forming the margin portions 114 and 115.

Meanwhile, a width of the margin portions 114 and 115 does not need to be particularly limited. However, in order to more easily achieve miniaturization and high capacitance of the multilayer electronic component, an average width of the margin portions 114 and 115 may be 15 μm or less. Additionally, the multilayer electronic component 100 according to some example embodiments of the present disclosure may include an internal electrode including Ni and a Ni-containing material, and in the first and third directional cross-section of the body 110, the capacitance formation portion may include a center portion C1 disposed in the center of the capacitance formation portion in the first direction and the third direction, and side portions T1-1, T1-2, M1-1 and M1-2 disposed in an upper portion and a lower portion of the first direction of the capacitance formation portion and on both side surfaces of the capacitance formation portion in the third direction. When a ratio of an area of the Ni-containing oxide included in the center portion to an area of the center portion is defined as SC, and a ratio of an area of the Ni-containing oxide included in the side portion to an area of the side portion is defined as SMT, the reliability of the multilayer electronic component may be improved by satisfying $0.9<SMT/SC<1.1$. Accordingly, even when the average width of the margin portions 114 and 115 is 15 μm or less, the reliability of the multilayer electronic component 100 may be secured.

The average width of the margin portions 114 and 115 may refer to an average size of the margin portions 114 and 115 in the third direction, and may be an average value of third directional sizes of the margin portions 114 and 115 measured at five points equally spaced apart from each other on a side surface of the capacitance formation portion Ac.

The internal electrodes 121 and 122 may be arranged alternately with the dielectric layer 111 in the first direction.

The internal electrodes 121 and 122 may include first and second internal electrodes 121 and 122. The first and second internal electrodes 121 and 122 may be disposed alternately so as to oppose each other with the dielectric layer 111 forming the body 110 interposed therebetween, and may be connected to the third and fourth surfaces 3 and 4 of the body 110, respectively. Specifically, one end of the first internal electrode 121 may be connected to the third surface, and one end of the second internal electrode 122 may be connected to the fourth surface.

The first internal electrode 121 may be spaced apart from the fourth surface 4 and may be exposed through the third surface 3, and the second internal electrode 122 may be spaced apart from the third surface 3 and may be exposed through the fourth surface 4. The first external electrode 130 may be disposed on the third surface 3 of the body and may be connected to the first internal electrode 121, and the second external electrode 140 may be disposed on the fourth surface 4 of the body and may be connected to the second internal electrode 122.

That is, the first internal electrode 121 may be connected to the first external electrode 130 without being connected to the second external electrode 140, and the second internal electrode 122 may be connected to the second external electrode 140 without being connected to the first external electrode 130. Accordingly, the first internal electrode 121 may be formed to be spaced apart from the fourth surface 4 by a certain distance, and the second internal electrode 122 may be formed to be spaced apart from the third surface 3 by the certain distance.

In this case, the first and second internal electrodes 121 and 122 may be electrically separated from each other by a dielectric layer 111 disposed therebetween.

The body 110 may be formed by alternately stacking a ceramic green sheet on which the first internal electrode 121 is printed and a ceramic green sheet on which the second internal electrode 122 is printed, and then sintering the ceramic green sheets.

A material forming the internal electrodes 121 and 122 is not particularly limited, and the material having excellent electrical conductivity may be used. For example, the internal electrodes 121 and 122 may include one or more selected from the group consisting of nickel (Ni), copper (Cu), palladium (Pd), silver (Ag), gold (Au), platinum (Pt), tin (Sn), tungsten (W), titanium (Ti), and alloys thereof.

Additionally, the internal electrodes 121 and 122 may be formed by printing a conductive paste for internal electrodes, including one or more selected from the group consisting of nickel (Ni), copper (Cu), palladium (Pd), silver (Ag), gold (Au), platinum (Pt), tin (Sn), tungsten (W), titanium (Ti) and alloys thereof, on the ceramic green sheet. A method of printing the conductive paste for internal electrodes may use a screen-printing method or a gravure printing method, and the present invention is not limited thereto.

Additionally, an average thickness te of the internal electrodes 121 and 122 need not be particularly limited. For example, the average thickness te of the internal electrodes 121 and 122 may be 0.2 μm or more and 2 μm or less.

When the average thickness of the internal electrodes 121 and 122 is 0.35 μm or less, it may be difficult to secure the connectivity of the internal electrodes. However, since the internal electrodes 121 and 122 according to an example embodiment of the present disclosure may include an Ni-containing oxide and Ni and may satisfy 0.9<SMT/SC<1.1, and thus, even when the average thickness of the internal electrodes 121 and 122 is 0.35 μm or less, the connectivity of the internal electrodes may be secured.

The average thickness te of the internal electrodes 121 and 122 may refer to an average thickness te of the internal electrodes 121 and 122.

The average thickness te of the internal electrodes 121 and 122 may be measured by scanning an image of a length and thickness direction (L-T) cross-section of the body 110 with the scanning electron microscope (SEM) of 10,000× magnification. More specifically, the average thickness of the internal electrodes may be obtained by measuring the thicknesses thereof at multiple points of one internal electrode, for example, 30 points equally spaced apart from each other in the length direction, from the scanned image, and measuring an average value thereof. The 30 points equally spaced apart from each other may be designated in the capacitance formation portion Ac. Additionally, when the average value is measured by extending an average value measurement up to 10 internal electrodes, the average thickness of the internal electrode may be further generalized.

Due to the high capacitance of the multilayer electronic component and the thinning of the internal electrodes and the dielectric layers, a problem may occur in which the strength of an interface between the internal electrode and the dielectric may be reduced, which may result in a decrease in the mechanical strength of the multilayer electronic component.

Additionally, the problem of deteriorating the withstand voltage characteristics of the multilayer electronic component due to the thinning of the dielectric layer may occur.

Accordingly, in some example embodiments of the present disclosure, the internal electrodes 121 and 122 may include Ni and the oxide-containing Ni, and the distribution of the oxide-containing Ni may be controlled to improve the mechanical strength and the withstand voltage characteristics of the multilayer electronic component.

Figure 3:
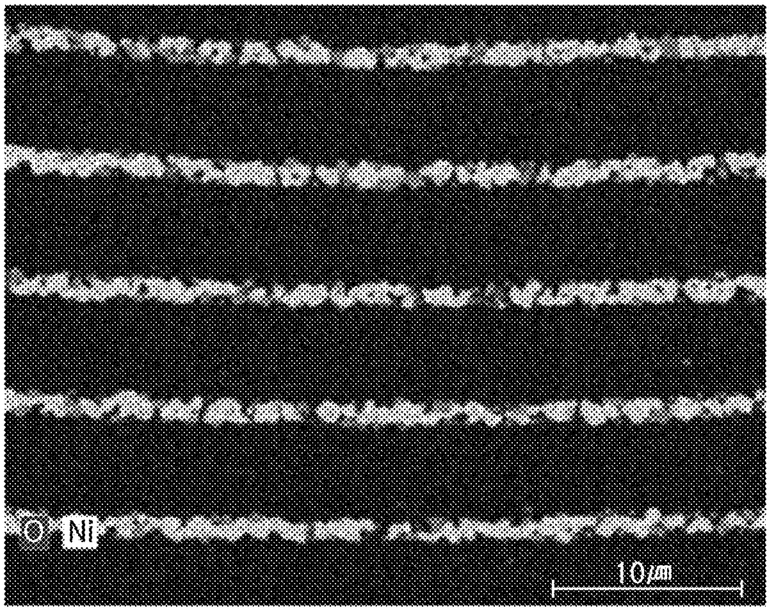
FIG. 3 is an image of a capacitance formation portion according to an example embodiment captured by a scanning electron microscope (SEM)

FIG. 3 illustrates the internal electrodes included in the a capacitance formation portion, and the gray area depicts an area including an oxide or an oxide-containing Ni, and the white part depicts an area including Ni. Referring to FIG. 3, the internal electrodes may include Ni and the oxide-containing Ni, and it may be confirmed that the oxide-containing Ni is not concentrated in a specific region of the capacitance formation portion, but is evenly distributed.

Figure 6:
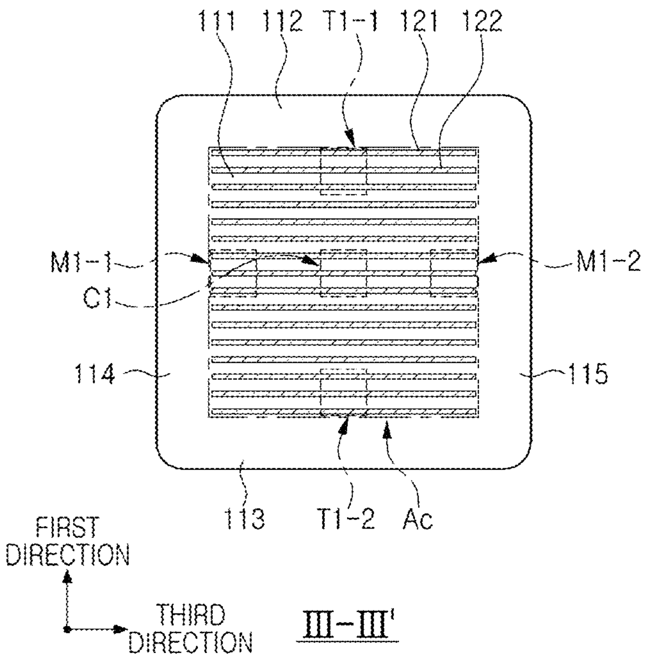
FIG. 6 is a cross-sectional view taken along line III-III of FIG. 1.

Referring to FIG. 6, in the first and third directional cross-section of the body, the capacitance formation portion Ac may include a center portion C1 disposed in the center of the capacitance formation portion Ac in the first direction and the third direction, and side portions T1-1, T1-2, M1-1 and M1-2 disposed on upper and lower portions of the capacitance formation portion Ac in the first direction and both side surfaces of the capacitance formation portion Ac in the third direction.

In this case, in some example embodiments of the present disclosure, when a ratio of an area of the Ni-containing oxide included in the center portion C1 to an area of the center portion C1 is defined as SC, and an area of the Ni-containing oxide included in the side portions T1-1, T1-2, M1-1 and M1-2 to an area of the side portions T1-1, T1-2, M1-1 and M1-2 is defined as SMT, SMT/SC may satisfy 0.9<SMT/SC<1.1.

When SMT/SC does not satisfy 0.9<SMT/SC<1.1, the oxide-containing Ni may not be evenly distributed on the internal electrodes 121 and 122 but may be locally formed on the internal electrodes 121 and 122, which may weaken the mechanical strength and withstand voltage characteristics of the multilayer electronic component 100.

Accordingly, in some example embodiments of the present disclosure, 0.9<SMT/SC<1.1 may be controlled to be satisfied, and the oxide-containing Ni may be evenly distributed on the internal electrodes 121 and 122, thereby improving the mechanical strength and the withstand voltage characteristics of the multilayer electronic component 100.

In some example embodiments, referring to FIG. 6, the center portion C1 may refer to a region disposed in the center in the first direction and the third direction, among five equally divided regions in the third direction, after dividing the capacitance formation portion Ac into five equal portions in the first direction, and the side portions T1-1, T1-2, M1-1 and M1-2 may refer to regions M1-1 and M1-2 in contact with both ends of the capacitance formation portion Ac in the third direction and disposed in the center in the first direction, and regions T1-1 and T1-2 in contact with both ends of the capacitance formation portion Ac in the first direction and disposed in the center in the third direction, among five equally divided regions in the third direction, after dividing the capacitance formation portion Ac into five equal portions in the first direction. That is, the area of each of the center portion C1 and the side portions T1-1, T1-2, M1-1 and M1-2 may vary depending on the size of the multilayer electronic component 100 or the area of the capacitance formation portion Ac. However, in the multilayer electronic component in which the area of the capacitance formation portion Ac is substantially the same, the area of each of the center portion C1 and the side portions T1-1, T1-2, M1-1 and M1-2 may be substantially the same as each other.

Meanwhile, the capacitance formation portion Ac may be divided into five equal portions in the first direction, and among the five equally divided regions in the third direction, the regions M1-1 and M1-2 in contact with both ends of the capacitance formation portion Ac in the third direction and disposed in the center in the first direction may be defined as margin-side portions, and the capacitance formation portion Ac may be divided into five equal portions in the first direction, and among the five equally divided regions in the third direction, the regions T1-1 and T1-2 in contact with both ends of the capacitance formation portion Ac in the first direction and disposed in the center in the third direction may be defined as cover-side portions. Meanwhile, cross-section III-III' of FIG. 1 expressed in FIG. 6 may correspond to a first and third directional cross-section polished to ½ point of the body 110 in the second direction.

In some example embodiments, when a ratio of the area of the oxide-containing Ni to an area of the cover-side portions T1-1 and T1-2 is defined as ST, and a ratio of the area of the oxide-containing Ni to an area of the margin-side portions M1-1 and M1-2 is defined as SM, $0.9<ST/SC<1.1$ and $0.9<SM/SC<1.1$ may be satisfied. Accordingly, the reliability and the withstand voltage characteristics of the multilayer electronic component 100 may be further improved by distributing the oxide-containing Ni more uniformly in the capacitance formation portion Ac.

Figure 7:
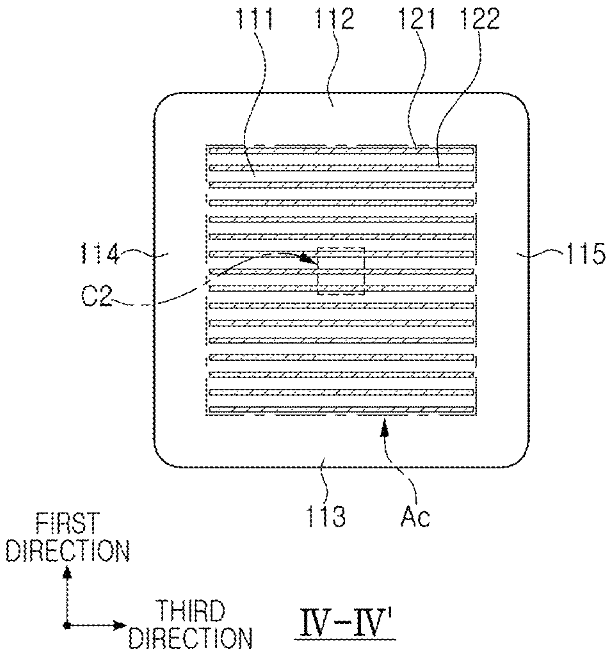
FIG. 7 is a cross-sectional view taken along line IV-IV of FIG. 1.
Figure 8:
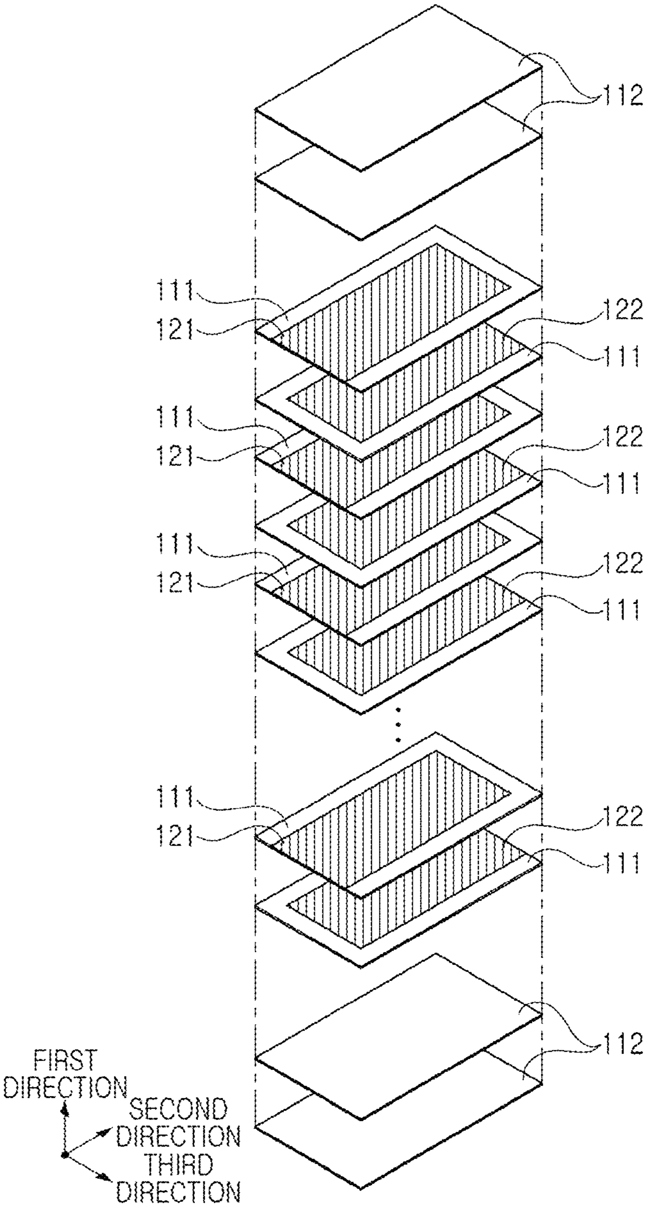
FIG. 8 is a schematic exploded perspective view of a body according to an example embodiment.

FIG. 5 corresponds to cross-section II-II' of FIG. 1, FIG. 6 corresponds to cross-section III-III' of FIG. 1, and FIG. 7 corresponds to cross-section IV-IV' of FIG. 1. More specifically, FIG. 5 may represent a first and third directional cross-section polished to ¼ point of the body 110 in the second direction, FIG. 6 may represent a first and third directional cross-section polished to ¼ (½) point of the body 110 in the second direction, and FIG. 7 may represent a first and third directional cross-section polished to ¾ point of the body 110 in the second direction.

In this case, the center portion of the capacitance formation portion Ac of the first and third directional cross-section polished to the ¼ point of the body 110 in the second direction may be defined as a first center portion C0, the center portion of the capacitance formation portion Ac of the first and third directional cross-section polished to the 2/4 point of the body 110 in the second direction may be defined as a second center portion C1, and the center portion of the capacitance formation portion Ac of the first and third directional cross-section polished to the ¾ point of the body 110 in the second direction may be defined as a third center portion C2.

In this case, when a ratio of an area of the Ni-containing oxide included in the first center portion C0 to a total area of the first center portion C0 is defined as SC0 (SC0=(an area of Ni-containing oxide in C0)/(a total area of C0)), a ratio of an area of the Ni-containing oxide included in the second center portion C1 to a total area of the second center portion C1 is defined as SC1 (SC1=(an area of Ni-containing oxide in C1)/(a total area of C1)), and a ratio of an area of the Ni-containing oxide included in the third center portion C2 to a total area of the third center portion C2 is defined as SC2 (an area of Ni-containing oxide in C2)/(a total area of C2)), $0.9<SC1/SC0<1.1$ and $0.9<SC2/SC0<1.1$ may be satisfied. Accordingly, not only may the Ni-containing oxide be uniformly distributed in the first direction or the third direction, but the oxide may also be uniformly distributed in the second direction, thereby further improving the reliability and the withstand voltage characteristics of the multilayer electronic component 100.

In some example embodiments, the ratio of the area of the Ni-containing oxide included in the capacitance formation portion Ac to the total area of the capacitance formation portion Ac may be 0.03 or more and 0.10 or less. Accordingly, the Ni-containing oxide may be uniformly distributed in the capacitance formation portion, thereby improving the strength of the multilayer electronic component 100, and the connectivity, capacitance characteristics, withstand voltage characteristics and reliability of the internal electrodes.

When the ratio of the area of the Ni-containing oxide included in the capacitance formation portion Ac is less than 0.03 or more than 0.10, the effect of improving the bonding strength between the internal electrodes 121 and 122 and the dielectric layer 111 may be somewhat insufficient.

Accordingly, in an example embodiment, the ratio of the area of the Ni-containing oxide included in the capacitance formation portion Ac may be controlled to be 0.03 or more and 0.10 or less, thereby improving the bonding strength between the internal electrodes 121 and 122 and the dielectric layer 111 and improving the mechanical strength of the multilayer electronic component 100.

When the internal electrode includes the Ni-containing oxide, the Ni-containing oxide may delay the contraction of the internal electrodes 121 and 122, and the dielectric layer 111 may not be subjected to contraction stress, so that a size of the dielectric grains may be reduced. That is, an area occupied by the Ni-containing oxide in the entire capacitance formation portion may be adjusted to control the size of the dielectric grains, and accordingly, the capacitance characteristics, withstand voltage characteristics, and reliability of the multilayer electronic component 100 may be improved.

Specifically, when a ratio of the area of the Ni-containing oxide included in the capacitance formation portion Ac is less than 0.03, a dielectric grain refinement effect may be somewhat insufficient, and when the ratio of the area of the Ni-containing in the capacitance formation portion Ac is more than 0.10, a sintering delay of the internal electrode may be excessively performed, which may reduce the connectivity of the internal electrode or locally increase a thickness of the internal electrode. Accordingly, it may be difficult to secure the capacitance characteristics, withstand voltage characteristics, and reliability thereof.

Accordingly, in an example embodiment, the ratio of the area of the Ni-containing oxide included in the capacitance formation portion Ac may be adjusted to be 0.03 or more and 0.10 or less to obtain a sufficient dielectric grain refinement effect, and the excessive sintering delay of the internal electrode may be prevented, thereby securing the capacitance characteristics, withstand voltage characteristics, and reliability of the multilayer electronic component.

Meanwhile, in an example embodiment, the area occupied by the Ni-containing oxide in the capacitance formation portion Ac or the degree to which the Ni-containing oxide is uniformly distributed in the capacitance formation portion Ac may be controlled by adjusting a degree of oxidation of Ni included in the internal electrode 121 and 122 in a pre-sintering process of the multilayer electronic component.

Additionally, in an example embodiment, the Ni-containing oxide may be disposed in the internal electrode 121 and 122. Accordingly, the connectivity of the internal electrode 121 and 122 may be improved.

Additionally, in an example embodiment, a portion of the Ni-containing oxide may be formed to contact the dielectric layer 111. Additionally, a portion of the Ni-containing oxide may be disposed in an interface between the dielectric layer 111 and the internal electrode. Accordingly, the bonding strength between the internal electrode 121 and 122 and the dielectric layer 111 may be improved.

A method of measuring the ratio of the area of the Ni-containing oxide included in the capacitance formation portion Ac to the area of the capacitance formation portion Ac is not particularly limited.

For example, in the first and third directional cross-section polished to the ½ point of the multilayer electronic component 100 in second direction as in an example embodiment, the capacitance formation portion Ac may be divided into the center portion C1 and the side portions T1-1, T1-2, M1-1 and M1-2, and then, elemental analysis may be conducted using a Scanning Electron Microscope-Energy Dispersive X-Ray Spectroscopy (SEM-EDS) in each region and a region in which the Ni-containing oxide is formed may be colored so that the region is distinguished from other regions, thus calculating and measuring the ratio of the area of the region having the Ni-containing oxide formed therein to the area of each region. When obtaining an average value of the ratio of the area of the region having the Ni-containing oxide formed therein to the area of each region measured in this manner, the value of the ratio of the area of the Ni-containing oxide included in the capacitance formation portion Ac to the area of the capacitance formation portion Ac may be further generalized.

Figure 4:
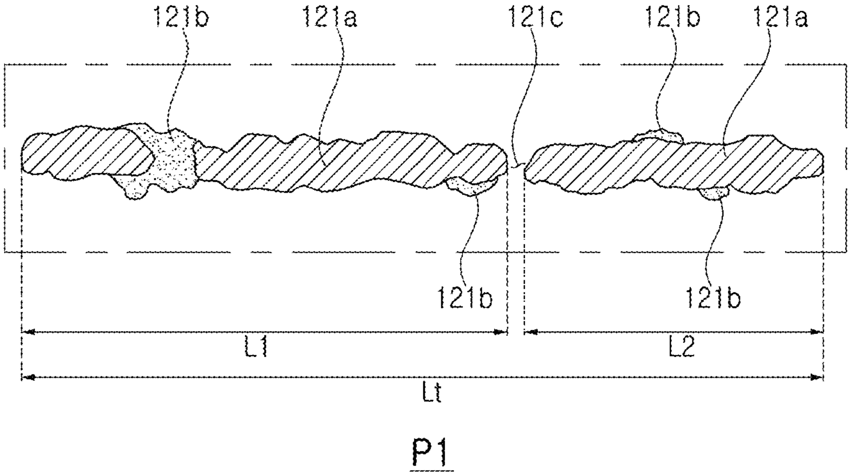
FIG. 4 is a schematic enlarged view of region P1 of FIG. 2.

Referring to FIG. 4, the internal electrode 121 may include one or more electrode portions, region including Ni 121*a* or an Ni-containing oxide 121*b*, and one or more disconnected portions 121*c* between the one or more electrode portions. In this case, the connectivity of the internal electrodes 121 and 122 may be expressed as a ratio of a sum of the lengths of one or more electrode portions (L1+L2) to a total length Lt of the internal electrode 121.

When the ratio of the sum of the lengths of the one or more electrode portions (L1+L2) to the total length Lt of the internal electrode 121 is less than 0.80, it may be difficult to secure the capacitance characteristics, withstand voltage characteristics, and reliability of the electronic component. Accordingly, the ratio of the sum of the lengths of the one or more electrode portions (L1+L2) to the total length Lt of the internal electrode 121 may be 0.80 or more.

An upper limit of the ratio of the sum of the lengths of the one or more electrode portions (L1+L2) to the total length Lt of the internal electrode 121 does not need to be specifically limited, but may be 0.95 or less.

In FIG. 4, the connectivity of the internal electrode has been described based on the first internal electrode 121, but the connectivity of the internal electrode may be defined in the same manner for the second internal electrode 122. Additionally, the connectivity of the internal electrodes may refer to an average value of values measured from three or more internal electrodes 121 and 122 selected from the capacitance formation portion Ac in the first direction in the first and third directional cross-section polished to the center of the multilayer electronic component 100 in the second direction.

In an example embodiment, the dielectric layer 111 may include a plurality of dielectric grains, and an average size of the plurality of dielectric grains may be 340 nm or more and 410 nm or less. The average size of the plurality of dielectric grains may be obtained using a method of measuring lengths of short and long axes of 10 or more arbitrary grains in the center portion C1 of the capacitance formation portion and calculating an average value thereof, or a method of measuring an area of the grains in pixels and converting the measured value into a circle-equivalent diameter, in the first and third directional cross-section polished to the center of the multilayer electronic component 100 in the second direction, but is not limited thereto. Additionally, in order to further generalize the average size of a plurality of dielectric grains, the same measurement may be performed on the side portions T1-1, T1-2, M1-1 and M1-2), and then an average value thereof may be obtained.

The external electrodes 130 and 140 may be disposed on the third surface 3 and the fourth surface 4 of the body 110. The external electrodes 130 and 140 may include first and second external electrodes 130 and 140 respectively disposed on the third and fourth surfaces 3 and 4 of the body 110 and connected to the first and second internal electrodes 121 and 122, respectively.

In this example embodiment, a structure in which a multilayer electronic component 100 has two external electrodes 130 and 140 is described, but the number or shape of the external electrodes 130 and 140 may be changed depending on the shape of the internal electrodes 121 and 122 or other purposes.

Meanwhile, the external electrodes 130 and 140 may be formed using any material that has electrical conductivity, such as a metal, and a specific material may be determined in consideration of electrical characteristics, structural stability, and the like, and further, the external electrodes 130 and 140 may have a multilayer structure.

For example, the external electrodes 130 and 140 may include an electrode layer disposed on the body 110 and a plating layer formed on the electrode layer.

For a more specific example of the electrode layer, the electrode layer may be a sintering electrode including a conductive metal and glass, or a resin-based electrode including a conductive metal and a resin.

Additionally, the electrode layer may be formed in a form in which the sintering electrode and the resin-based electrode are sequentially formed on the body. Additionally, the electrode layer may be formed by transferring a sheet including the conductive metal onto the body, or may be formed by transferring a sheet including the conductive metal onto the sintering electrode.

A material having excellent electrical conductivity may be used as the conductive metal included in the electrode layer, and is not particularly limited. For example, the conductive metal may be one or more of nickel (Ni), copper (Cu), and alloys thereof.

The plating layer serves to improve the mounting characteristics. The type of plating layers is not particularly limited, and may be a plating layer including at least one of Ni, Sn, Pd and alloys thereof, and may be formed of a plurality of layers.

For a more specific example of the plating layer, the plating layer may be a Ni plating layer or a Sn plating layer, and may be in a form in which the Ni plating layer and the Sn plating layer are sequentially formed on the electrode layer and may be in a form in which the Sn plating layer, the Ni plating layer and the Sn plating layer are sequentially formed. Additionally, the plating layer may include a plurality of Ni plating layers and/or a plurality of Sn plating layers.

The size of the multilayer electronic component 100 does not need to be particularly limited. However, in order to achieve miniaturization and high capacitance simultaneously, thicknesses of the dielectric layer and the internal electrode should be thinned to increase the number of stacked layers, so that the reliability improvement effect according to the present invention may be more remarkable in a multilayer electronic component 100 having a size of 0603 (length×width, 0.6 mm×0.3 mm) or less.

Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Inventive Example 1

Table 1 below illustrates sample 1 in which a ratio of an area of an Ni-containing oxide to an area of a capacitance formation portion Ac is less than 0.03, sample 2 in which the ratio of the area of the Ni-containing oxide to the area of the capacitance formation portion Ac is 0.03 or more and 0.10 or less, and sample 3 in which the ratio of the area of the Ni-containing oxide to the area of the capacitance formation portion Ac is more than 0.10, in which a second directional grinding point of the multilayer electronic component was changed to an area ratio of the Ni-containing oxide included in a center portion to an area of the center portion (an area fraction (%) of the Ni-containing oxide) in the center portion in a first and the third directional cross-section.

TABLE 1

| | Sample 1 | Sample 2 | Sample 3 |
|---|---|---|---|
| Second Directional Grinding Point | Area Fraction (%) of Ni-Containing Oxide | | |
| ¼ point | 2.78 | 4.61 | 11.37 |
| 2/4 point | 2.68 | 4.98 | 10.52 |
| ¾ point | 2.89 | 4.75 | 11.44 |

Referring to Table 1 above, regardless of the polished point of the multilayer electronic component in the second direction, it may be confirmed that the dispersion of the area fraction (%) of the Ni-containing oxide in the center portion of the first and third directional cross-section is within 10%. That is, as in an example embodiment, it may be confirmed that a ratio of an area of the Ni-containing oxide included in the first center portion C0 to an area of the first center portion C0 is defined as SC0, a ratio of an area of the Ni-containing oxide included in the second center portion C1 to an area of the second center portion C1 is defined as SC1, and a ratio of an area of the Ni-containing oxide included in the third center portion C2 to an area of the third center portion C2 is defined as SC2, 0.9<SC1/SC0<1.1 and 0.9<SC2/SC0<1.1 may be satisfied.

In this case, in Sample 2 in which the ratio of the area of the Ni-containing oxide included in the capacitance formation portion Ac to the area of the capacitance formation portion Ac was 0.03 or more and 0.10 or less, in the capacitance formation portion Ac polished to the 2/4 (½) point in the second direction, an area ratio of the Ni-containing oxide included in the region as compared to the area by region (area fraction (%) of the Ni-containing oxide) was measured and is illustrated in Table 2.

Regions 1 and 2 represents cover-side portions T1-1 and T1-2 according to an example embodiment, region 3 represents a center portion C1 according to an example embodiment, and regions 4 and 5 represents regions corresponding to the margin-side portions M1-1 and M1-2 according to an example embodiment.

TABLE 2

| | Region 1 | Region 2 | Region 3 | Region 4 | Region 5 |
|---|---|---|---|---|---|
| Area Fraction (%) of Ni-Containing Oxide | 4.97 | 4.68 | 4.93 | 4.58 | 4.63 |

Referring to Table 2, it may be confirmed that in each region, the ratio of the area of the Ni-containing oxide including included in the corresponding region to the area of each region is 10% or less. That is, as in an example embodiment, it may be confirmed that a ratio of an area of the Ni-containing oxide included in the first center portion C0 to an area of the first center portion C0 is defined as SC0, a ratio of an area of the Ni-containing oxide included in the second center portion C1 to an area of the second center portion C1 is defined as SC1, and a ratio of an area of the Ni-containing oxide included in the third center portion C2 to an area of the third center portion C2 is defined as SC2, 0.9<SC1/SC0<1.1 and 0.9<SC2/SC0<1.1 may be satisfied.

Inventive Example 2

Figure 9C:
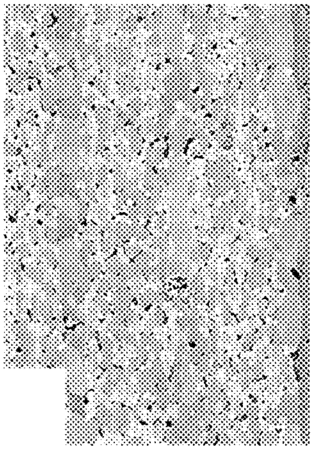
FIGS. 9A-9C are images of a change in a size of a dielectric grain of a dielectric layer observed by a scanning electron microscope (SEM) according to a ratio of an area of an Ni-containing oxide included in the capacitance formation portion to an area of a capacitance formation portion.
Figure 9B:
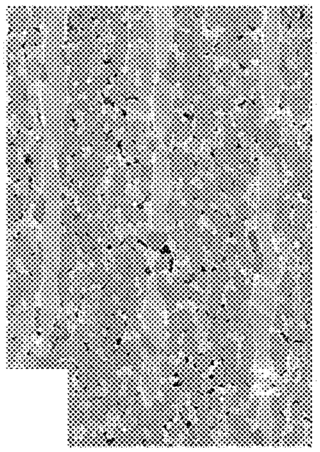
Figure 9A:
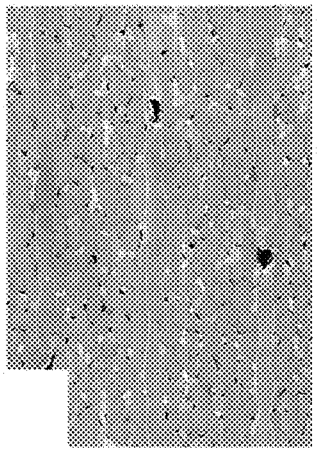

FIGS. 9A-9C are images of a change in a size of a dielectric grain of a dielectric layer observed by a scanning electron microscope (SEM) according to a ratio of an area of an Ni-containing oxide included in the capacitance formation portion to an area of a capacitance formation portion.

FIG. 9A is a case in which a ratio of an area of the Ni-containing oxide included in the capacitance formation portion Ac to an area of thea capacitance formation portion Ac is less than 0.03, FIG. 9B is a case in which the ratio of the area of the Ni-containing oxide included in the capacitance formation portion Ac to the area of the capacitance formation portion Ac is 0.03 or more and 0.10 or less, and FIG. 9C is a case in which the ratio of the area of the Ni-containing oxide included in the capacitance formation portion Ac to the area of the capacitance formation portion Ac is more than 0.10.

It may be confirmed that the size of the dielectric grains of the dielectric layer is smaller in FIG. 9B than in FIG. 9A.

It may be confirmed that a local thickness increase of the internal electrode of FIG. 9C is greater than that of FIG. 9B, and the disconnection portion thereof also increases.

That is, when the ratio of the area of the Ni-containing oxide included in the capacitance forming portion Ac to the area of the capacitance forming portion Ac as in an example embodiment is 0.03 or more and 0.10 or less, the dielectric grain size of the dielectric layer may be refined while securing the connectivity of the internal electrode.

Inventive Example 3

Figure 10:
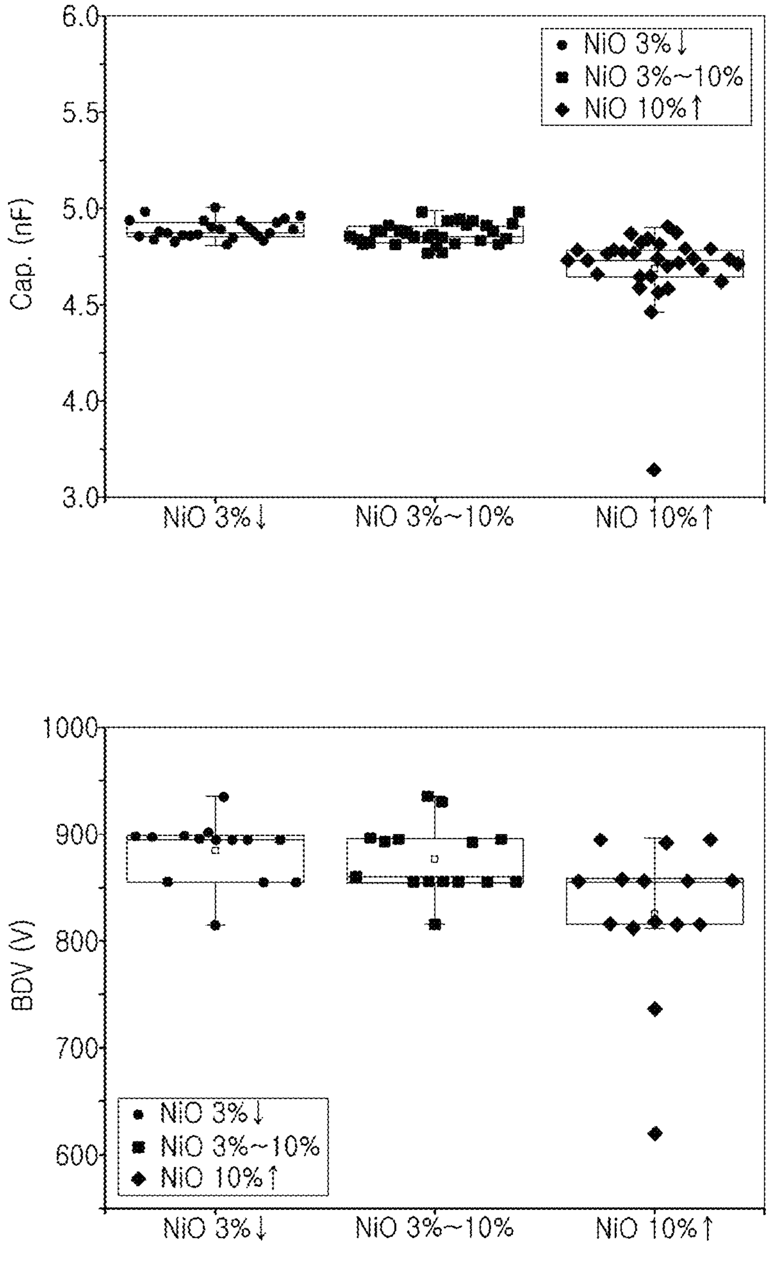
FIG. 10 is a graph illustrating electrostatic capacitance and withstand voltage characteristics according to a ratio of an area of an Ni-containing oxide included in a capacitance formation portion to an area of a capacitance formation portion.

FIG. 10 is a graph illustrating electrostatic capacitance and withstand voltage characteristics according to a ratio of an area of an Ni-containing oxide included in a capacitance formation portion to an area of a capacitance formation portion.

Referring to FIG. 10, it may be confirmed that when the ratio of the area of the Ni-containing oxide included in the capacitance formation portion Ac to the area of the capacitance formation portion Ac is 0.03 (3%) or more and 0.10 (10%) or less, there is no deterioration in the capacitance characteristics and withstand voltage characteristics, whereas when the ratio of the area of the Ni-containing oxide included in the capacitance formation portion Ac to the area of the capacitance formation portion Ac is less than 0.03 (3%), there is a deterioration in the withstand voltage characteristics, and when the ratio of the area of the Ni-containing oxide included in the capacitance formation portion Ac to the area of the capacitance formation portion Ac is more 0.10 (10%), there is a deterioration in the capacitance characteristics and the withstand voltage characteristics.

The capacitance characteristics were measured as a value of an electrostatic capacitance (nF) using a capacitance meter under the conditions of 1 kz and 1V, and the BDV characteristics were measured as a value (V) of the breakdown voltage at the moment when the insulation breakdown occurred while increasing by 5V per second.

That is, when the ratio of the area of the Ni-containing oxide included in the capacitance formation portion Ac to the area of the capacitance formation portion Ac is 0.03 (3%) or more and 0.10 (10%) or less, as in an example embodiment, the capacitance characteristics and the withstand voltage characteristics of the multilayer electronic component may be secured simultaneously.

Inventive Example 4

Table 3 below illustrates Sample 1 in which the ratio of the area of the Ni-containing oxide included in the capacitance formation portion Ac to the area of the capacitance formation portion Ac is less than 0.03, Sample 2 in which the ratio of the area of the Ni-containing oxide included in the capacitance formation portion Ac to the area of the capacitance formation portion Ac is 0.03 or more and 0.10 or less, and Sample 3 in which the ratio of the area of the Ni-containing oxide included in the capacitance formation portion Ac to the area of the capacitance formation portion Ac is more than 0.10, in which a crack occurrence rate and reliability that occurred through a Destructive Physical Analysis (DPA) were evaluated and are shown.

The Destructive Physical Analysis (DPA) was performed so that when the multilayer electronic component was polished to the ½ point in the second direction with 200-grit sandpaper, the first and third directional cross-section was observed with an optical microscope (OM) to determine if cracks occurred.

The reliability evaluation was performed by advancing a first step under the conditions of 150° C., 250V and 4 hr, advancing operations up to a seventh step by increasing the voltage by 50V each time, and performing an eighth step under the conditions of 150° C., 600V and 12 hr, and then, and a case in which the insulation resistance decreased to equal to or less than 1/100 times the initial value was evaluated as Fail.

TABLE 3

| Test Number | DPA Crack Rate | Reliability Evaluation (Fail Number/ Number of Samples ) |
|---|---|---|
| Sample 1 | (6/100) | 4/400 |
| Sample 2 | (0/100) | 0/400 |
| Sample 3 | (3/100) | 8/400 |

Referring to Table 3, it may be confirmed that the mechanical strength and the reliability are not excellent for Sample 1 and Sample 3, and the DPA crack rate for Sample 2 is 0%, and the number of Fails in the reliability evaluation is 0.

That is, it may be confirmed that when the ratio of the area of the Ni-containing oxide included in the capacitance formation portion Ac to the area of the capacitance formation portion Ac as in an example embodiment is 0.03 or more and 0.10 or less, the mechanical strength and reliability of the multilayer electronic component 100 are improved.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component, comprising:

a body including a dielectric layer and a first internal electrode and a second internal electrode alternately arranged in a first direction with the dielectric layer interposed therebetween; and external electrodes respectively disposed on surfaces opposing each other in a second direction, perpendicular to the first direction of the body, wherein the internal electrodes include an Ni-containing oxide and Ni other than Ni included in the Ni-containing oxide, a region in which the first internal electrode and the second internal electrode overlap each other in the first direction is defined as a capacitance formation portion, in a first and third directional cross-section of the body, the capacitance formation portion includes a center portion disposed in a center of the capacitance formation portion in the first direction and the third direction, and side portions disposed on upper and lower portions of the capacitance formation portion in the first direction and on both side surfaces of the capacitance formation portion in the third direction, and when a ratio of an area of the Ni-containing oxide included in the center portion to a total area of the center portion is defined as SC, and a ratio of an area of the Ni-containing oxide included in the side portions to a total area of the side portions is defined as SMT, 0.9<SMT/SC<1.1 is satisfied.

2. The multilayer electronic component according to claim 1, wherein the center portion is a region disposed in the center in the first direction and the third direction, among five equally divided regions in the third direction, after dividing the capacitance formation portion into five equal portions in the first direction, and the side portion is a region in contact with both side surfaces of the capacitance formation portion in the third direction and disposed in the center of the first direction, and a region in contact with both side surfaces of the capacitance formation portion in the first direction and disposed in a center in the third direction, among five equally divided regions in the third direction, after dividing the capacitance formation portion into five equal portions in the first direction.

3. The multilayer electronic component according to claim 1, wherein among the side portions, a region disposed on a side surface of the capacitance formation portion in the first direction is referred to a cover-side portion, and a region disposed on a side surface of the capacitance formation portion in the third direction is defined as a margin-side portion, and when a ratio of an area of the Ni-containing oxide included in the cover-side portion to a total area of the cover-side portion is defined as ST, and a ratio of an area of the Ni-containing oxide to a total area of the margin-side portion is defined as SM, 0.9<ST/SC<1.1 and 0.9<SM/SC<1.1 are satisfied.

4. The multilayer electronic component according to claim 1, wherein a center portion of the capacitance formation portion in the first and third directional cross-section polished to ¼ point of the body in the second direction is defined as a first center portion, a center portion of the capacitance formation portion in the first and third directional cross-section polished to 2/4 point of the body in the second direction is defined as a second center portion, and a center portion of the capacitance formation portion in the first and third directional cross-section polished to ¾ point of the body in the second direction is defined as a third center portion, and when a ratio of an area of an Ni-containing oxide included in the first center portion to an area of the first center portion is defined as SC0, a ratio of an area of an Ni-containing oxide included in the second center portion to an area of the second center portion is defined as SC1, and a ratio of an area of an Ni-containing oxide included in the third center portion to an area of the third center portion is defined as SC2, 0.9<SC1/SC0<1.1 and 0.9<SC2/SC0<1.1 are satisfied.

5. The multilayer electronic component according to claim 1, wherein a ratio of an area of an Ni-containing oxide included in the capacitance formation portion to an area of the capacitance formation portion is 0.03 or more and 0.10 or less.

6. The multilayer electronic component according to claim 1, wherein the Ni-containing oxide is disposed in the internal electrode.

7. The multilayer electronic component according to claim 1, wherein the Ni-containing oxide is disposed in an area of the internal electrode which is in contact with the dielectric layer.

8. The multilayer electronic component according to claim 1, wherein the Ni-containing oxide is disposed in an interface between the internal electrode and the dielectric layer.

9. The multilayer electronic component according to claim 1, wherein the internal electrode includes one or more electrode portions, which is a region including the Ni or the Ni-containing oxide, and one or more disconnected portions, a disconnected region between the one or more electrode portions, and a ratio of a sum of lengths of the plurality of electrode portions to a total length of the internal electrode is 0.80 or more and 0.95 or less.

10. The multilayer electronic component according to claim 1, wherein the dielectric layer includes a plurality of dielectric grains, and an average grain size of the plurality of dielectric grains is 340 nm or more and 410 nm or less.

11. The multilayer electronic component according to claim 1, wherein an average thickness of the dielectric layer is 0.35 μm or less.

12. The multilayer electronic component according to claim 1, wherein an average thickness of the internal electrode is 0.35 μm or less.

* * * * *